May 26, 1925.
C. A. SAWYER, JR
1,539,430
SAFETY CLUTCH MECHANISM
Filed April 9, 1921
2 Sheets-Sheet 2
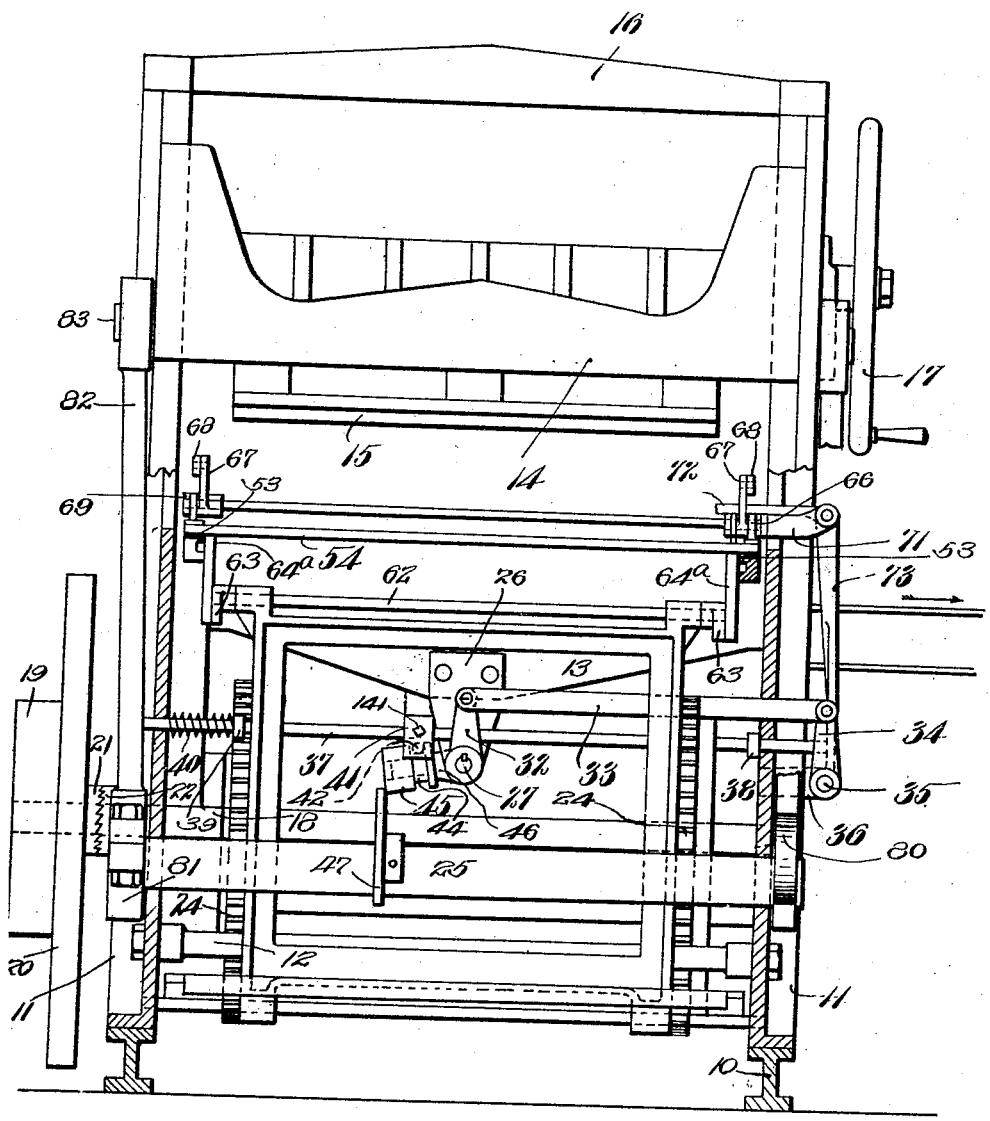
Inventor:
Charles A. Sawyer Jr
by James R. Hodder
att'y.

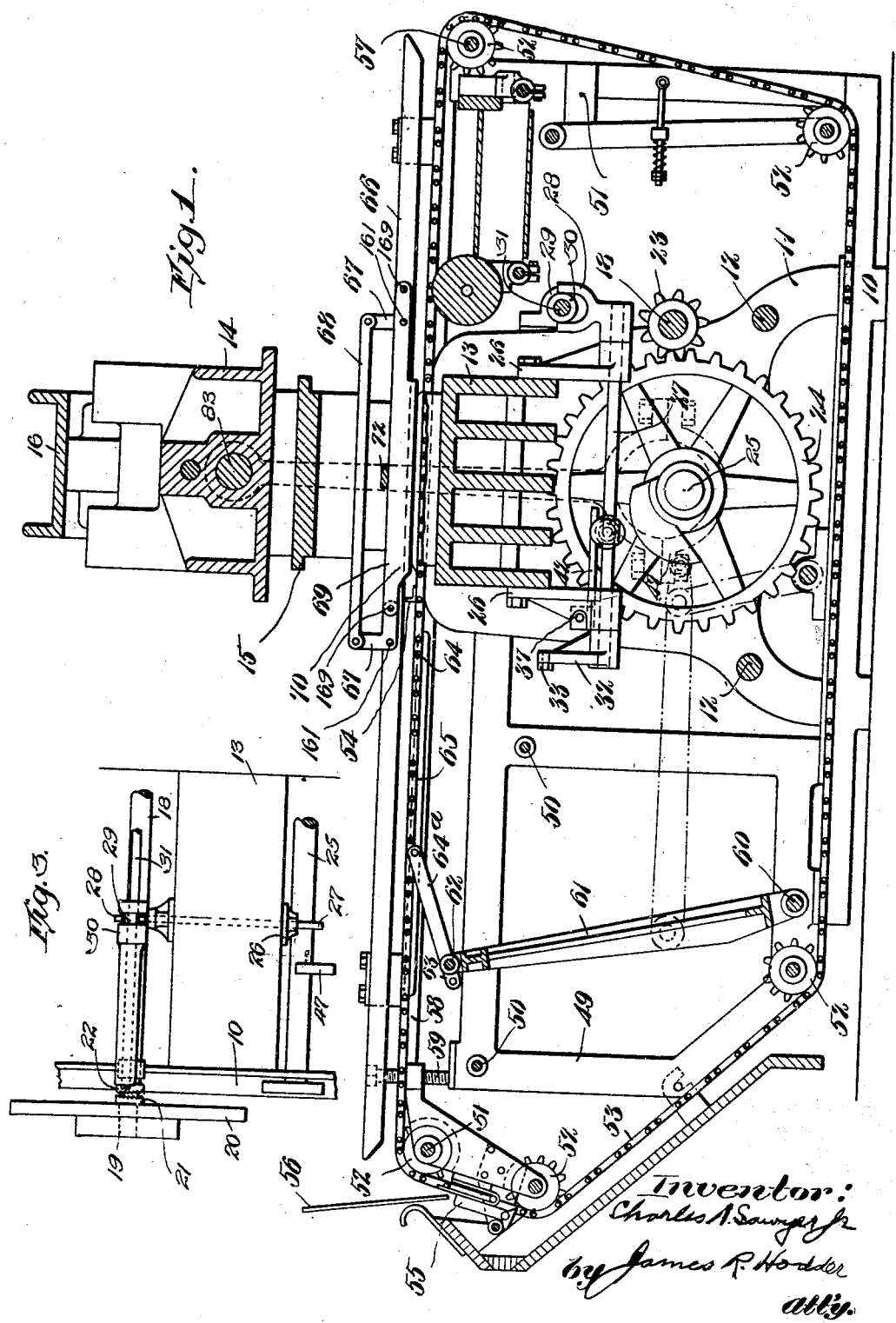

Patented May 26, 1925.

1,539,430

UNITED STATES PATENT OFFICE.

CHARLES ADRIAN SAWYER, JR., OF NEWTON, MASSACHUSETTS.

SAFETY CLUTCH MECHANISM.

Application filed April 9, 1921. Serial No. 460,117.

*To all whom it may concern:*

Be it known that I, CHARLES ADRIAN SAWYER, Jr., a citizen of the United States, and resident of Newton, in the county of Middlesex and State of Massachusetts, have invented an Improvement in Safety Clutch Mechanisms, of which the following description, in connection with the accompanying drawings, is a specification, like letters on the drawings representing like parts.

My present invention relates to clutching devices, and more particularly to an improved safety clutching device applicable for use in punch presses, stamping machines and the like.

In punching or stamping machines adapted for continuous operation, and in which material is continuously fed into position beneath, or in alinement with, operating tools, such as cutters, it is desirable that means be provided for preventing possible injury to the operating tools, and even the machine itself, should the various parts of the machine fail to function properly and in synchronism. In my development of the leather cutting art, particularly the rapid and economical blanking out of shoe sole blanks, I have devised a machine in which strips of sole leather are continuously fed beneath a reciprocating cutter head, the blanking out of the shoe sole blanks being an automatic continuous operation. This machine forms the subject matter of my copending application Ser. No. 492,908, filed Aug. 17, 1921, and while such machine operates perfectly to produce the desired results, the capital invested is too great to warrant the risk of injury should the various elements thereof fail to function in synchronism. As the greatest risk is the injury to the expensive cutters, I have devised means for automatically operating the clutching mechanism to disconnect the operating mechanism of the machine from the power transmitting devices should the machine fail to function properly. I prefer to have such means constantly in action, to perform their function should this be necessary, and to be practically under the control of those portions of the machine that are likely to cause damage to the machine. To this end, I control the positioning of the clutch operating mechanism by means operated by the material moving bars.

An object of my invention is an improved safety clutch operating mechanism.

Another object is an improved safety clutch operating mechanism controlled in its action by a movable portion of the machine to which the clutch is applied.

Still another object is an improved clutch operating mechanism movable into and out of operative position in synchronism with a movable part of the machine to which it is applied.

Further objects and novel features of the construction and arrangement of parts will appear as the description of the invention progresses.

In the accompanying drawings, illustrating the preferred embodiment of my invention, Fig. 1 is a longitudinal sectional elevation, Fig. 2 is an end elevation, looking from the left in Fig. 1, and partly in section, and Fig. 3 is a detail plan view, partly in section, showing the clutch operating mechanism.

Referring to the drawings, 10 designates a base of a leather cutting machine, such as that described and claimed in my copending application, Ser No. 492,908, filed Aug. 17, 1921, to which my invention has been applied. On this base 10 is mounted standards or uprights 11 spaced apart and held in position by bars 12. Intermediate the ends of the standards 11 is a bed 13 on which is mounted a block of wood or other suitable material, on which the leather strips are placed to be cut into sole blanks. In the upper part of the standards 11 is an adjustable cross-head 14 in which is mounted for reciprocation, a cutter head 15, the crosshead 14 being adjustable vertically by means of suitable gears and shafts operated by the hand wheel 17. The standards 11 are tied together by a cross-plate 16. A shaft 18 mounted in suitable bearings on the standards 11, is provided at one end with a rotatable pulley 19, fly wheel 20 and one member 21 of a clutch. Slidably mounted on, but rotatable with, the shaft 18 is another member 22 of the clutch, and provision is made for bringing the members 21 and 22 into and out of engagement with each other to control the operation of the shaft 18. Intermediate the ends of the shaft 18 are secured the spur gears 23, which mesh with the gears 24 mounted on the rotatable shaft 25 in the standards 11. Through suitable connections between the shaft 25 and the cross-head 14, said cross head is reciprocated. As, however, such forms of connections are well known, and as the details of the same do not concern my present invention, they will not be further described herein. On the shaft 25, adjacent to each end thereof is formed or secured an eccentric 80 and on each of these eccentrics is rotatably mounted an eccentric strap 81 formed on the lower end of connecting rods 82. The upper ends of these connecting rods 82 are rotatably mounted on the shaft 83 secured in the crosshead 14.

Bearing brackets 26, attached to either side of the bed 13, have rotatably mounted therein a shaft 27. At the rear of said shaft, or at the right hand side of Fig. 1, is securely fastened a clutch operating fork 28 which cooperates with a groove 29 in a member 30 slidably mounted on a shaft 31, mounted on the standards 11 said member 30 being associated with the clutch member 22. At the front end of the shaft 27 is secured a crank arm 32, to the free end of which is pivotally attached one end of a connecting rod 33, the other end of which is pivotally attached to the free end of a crank arm 34, secured to a shaft 35 rotatably mounted in bearing brackets 36 on one of the standards 11. Slidably mounted in the standards 11, and parallel to the shaft 25 is a rod 37, provided near one end with a stop 38 which engages with one of the standards 11 to limit the movement of said rod to the right, as viewed in Fig. 2. Near the other end of the rod 37 is a stop 39 and on the rod and between this stop and the standard 11 to the left of the machine, as viewed in Fig. 2, is a coil spring 40, which tends to force the rod 39 to the right. Adjustably mounted by setscrew 141 on the rod 37 is a block 41 carrying a pin or rod 42 which extends rearwardly of the machine and cooperates with a circular groove 44 in a roller 45, rotatably mounted on a stub shaft 46 secured to the shaft 27. As shown in Fig. 2, this roller lies slightly to the right of the cam 47 secured to the shaft 25. There is an operating handle (not shown) secured to the shaft 35 and positioned within easy and convenient reach of the operator, who stands at the front of the machine, or at the extreme left of Fig. 1. By means of this handle (not shown), clutching mechanism above described may be controlled by the operator. Mounted on the base 10, at the front of the standards 11, are frame members 49 spaced apart and held in position by rods 50, while on the base and at the rear of the standards 11 is a frame 51. In the frames 49 and 51 are shafts carrying a plurality of sprockets 52 over which run chains 53, these chains being connected together and spaced apart by a plurality of cross bars 54 but one of which is shown, which chains carry gripping devices 55 that grip and hold the leather strips 56 during their passage through the machine. In the frame 51, near the top thereof is a shaft 57, on which is mounted a pair of the sprockets 52, and on this shaft is pivotally mounted a frame 58, the front end of which is adjustable with respect to the frame 49 by studs 59. A shaft 60 in the frame 49 has pivotally mounted therein a frame 61 carrying at its upper end a shaft 62. At each end of the shaft 62 is secured a crank 63 having pivotally mounted at its free end a connecting rod 64ª.

The side members of the frame 58 are each provided, on their inner face with a groove 64 in which is mounted a push bar 65 carrying members (not shown) which successively engage the cross bars 54 to feed the chains 53 forward step by step. The various operating parts above described are so proportioned and positioned with relation to each other as to cause the cross bars 54 to bring sheets of leather 56 into position beneath the cross head 14 and remove the same therefrom at the proper time. The operator, therefore, by properly manipulating the handle (not shown) brings the clutch members 21 and 22 into engagement with each other, and the further action of the machine is automatic, his only duty thereafter being to feed strips of leather 56 to the device.

It may happen, however, that the onward movement of the cross bars 54 and the downward movement of the cutter head 15 will not be in synchronism, and under these circumstances there is grave danger of serious injury to the machine. To guard against this contingency, I provide on the side members of the frame 58, bars 66, and on said bars I pivotally mount at 161 a pair of bell crank levers 67, to one arm of each I pivotally attach a connecting rod 68, while to the other arm of each lever 67 I pivotally attach at 169 a second connecting rod 69 equal in length to the length of the connecting rod 68, and formed on the bottom of each connecting rod 69 is a shoe 70 beveled at its forward end and slightly greater in length than the width of the cutting block. As the cross bars 54 move along the frame 58, they engage the bevel at the front end of the shoes 70, moving the connecting rod 69 upwardly, and keeping it in its uppermost position until the cross bars 54 move beyond the rear end of such shoes 70, when such shoes and connecting rods fall by their own weight into their lowermost position. Attached to the right hand bar 66, as viewed in Fig. 2, is a bearing bracket 71, in which is pivotally mounted a bell crank lever, one arm 72 of which extends inward and rests on the top of the connecting rod 69, while the other arm 73 extends downward into position to engage with the spring pressed rod 37, heretofore described. Assuming that the machine is in operation, and that the leather sheets or strips 56 are fed successively beneath the cutter head 15 to be cut into sections, such as shoe sole blanks, it will be obvious that as the cross bar 54 comes into engagement with the bevel on the shoe 70, the connecting rod 69 will be raised, raising the arm 72 of the bell crank lever about the pivot point in the bearing bracket 71 and moving the free end of the arm 73 to the left, as viewed in Fig. 2, against the spring pressed rod 37, thus moving the rod 42 to the left and causing a movement to the left of the roller 45 into the path of movement of the cam 47, attached to the shaft 25. This cam 47 is so positioned on the shaft 25 with relation to the reciprocating movement of the cutter head 15 and the movement of the chains 53 that assuming the cutter head 15 and chains 53 to be moving in synchronism, the roller 45 will move out of the path of movement of the cam 47 by the movement of the cross bar 54 past the shoe 70 at the proper instant and the consequent movement to the right, as viewed in Fig. 2, of the spring pressed rod 37. The clutching mechanism, therefore, will be held in operative position as long as the cross bars 54 come successively into and out of position. If, however, one of the cross bars 54 over-runs when coming into position with respect to the cutter head 15, or does not move far enough when the cutting operation is completed, the end of the arm 72 will remain raised and the roller 45 held in position in the path of the cam 47. The cam 47, engaging the roller 45, rotates the shaft 27, and by means of the clutch fork 28 disengages the clutch members 21 and 22 to stop the rotation of the shaft 25 and thus prevent downward movement of the cutter head 15, and possible injury to the cutters carried thereby by reason of their engagement with the cross bar.

As long, therefore, as the machine is operating properly, the safety clutch operating mechanism will not operate to stop the machine, but is always in position to do so, moving into such position at every stroke of the cutter head, and out of such position again if its services are not required. When its services are required, its action is positive and no damage can result to the machine.

As my improved device was developed for use with a leather cutting machine, such as described and claimed in my copending application, Ser. No. 492,908, above referred to, I have, in this application, described it in connection with such a machine, but as the device is capable of being used as a safety device for general machine use, I desire to claim it broadly. While I have described the construction of my device somewhat in detail, it is to be understood that I may vary the size, shape and arrangement of parts constituting the same within wide limits without departing from the spirit of the invention.

My invention is further described and defined in the form of claims as follows:

1. An improved clutch operating mechanism comprising a rotatable shaft, a cam thereon, a clutch for connecting said shaft to a source of power, clutch operating means, a stub shaft connected thereto, a roller slidably and rotatably mounted on said stub shaft, and means for moving said roller into and out of the path of movement of said cam at predetermined times.

2. An improved clutch operating mechanism comprising a rotatable shaft, a cam thereon, a clutch for connecting said shaft to a source of power, clutch operating means, a stub shaft connected thereto, a roller slidably and rotatably mounted on said stub shaft, a slidable shaft connected to said roller, and controlling the slidable movement thereof for moving the same into and out of the path of movement of said cam at predetermined times.

3. An improved clutch operating mechanism comprising a rotatable shaft, a cam thereon, a clutch for connecting said shaft to a source of power, clutch operating means, a stub shaft connected thereto, a roller slidably and rotatably mounted on said stub shaft, a slidable shaft connected to said roller and pivotally mounted means controlling the movement of said slidable shaft to move said roller into and out of the path of movement of said cam at predetermined times.

4. An improved clutch operating mechanism comprising a rotatable shaft, a cam thereon, a clutch for connecting said shaft to a source of power, clutch operating means, a stub shaft connected thereto, a roller slidably and rotatably mounted on said stub shaft, a slidable shaft connected to said roller, pivotally mounted means controlling the movement of said slidable shaft to move said roller into and out of the path of movement of said cam at predetermined times, and means for controlling the pivotally mounted means.

In testimony whereof, I have signed my name to this specification.

CHARLES ADRIAN SAWYER, Jr.